May 22, 1951 — D. A. SIRACUSA — 2,553,985
FISHING TOOL
Filed Oct. 2, 1945 — 2 Sheets-Sheet 1

INVENTOR
DANTE A. SIRACUSA,
BY
ATTORNEY

May 22, 1951 — D. A. SIRACUSA — 2,553,985
FISHING TOOL
Filed Oct. 2, 1945 — 2 Sheets-Sheet 2
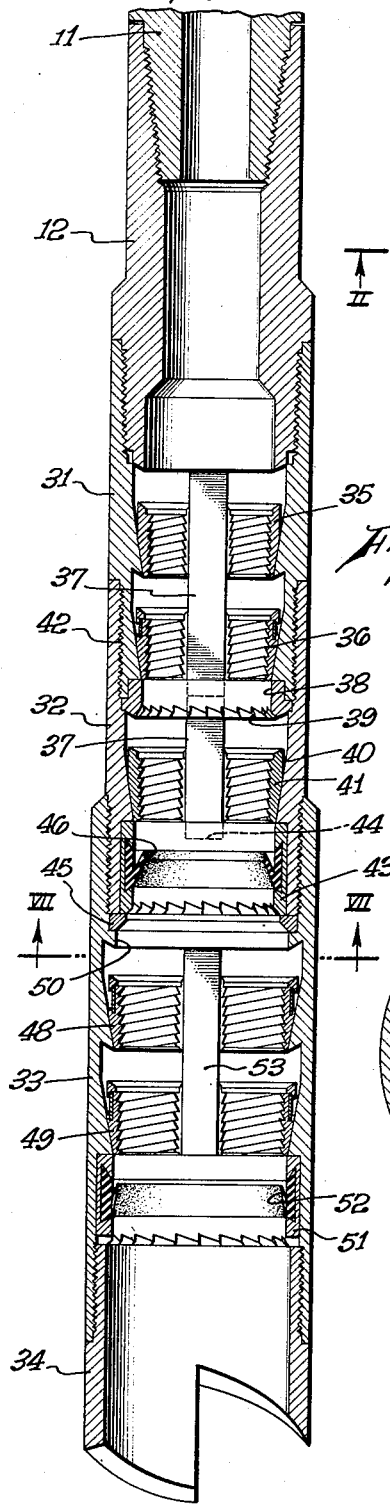
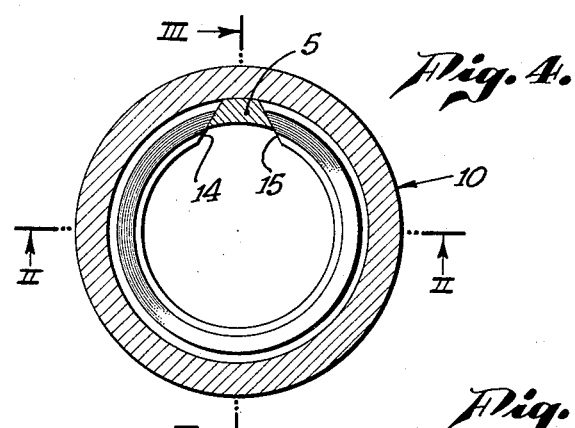
Fig. 4.
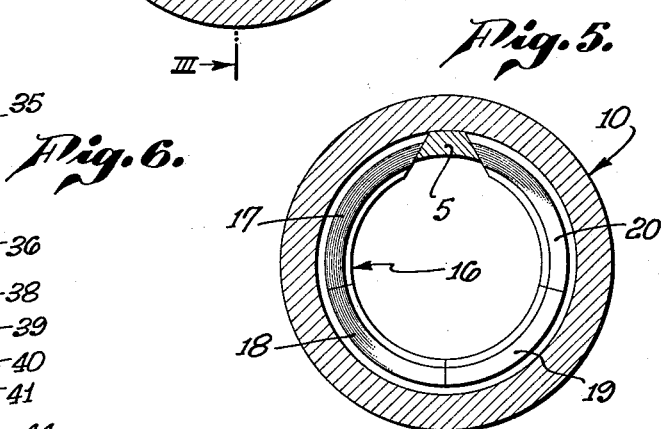
Fig. 5.
Fig. 6.
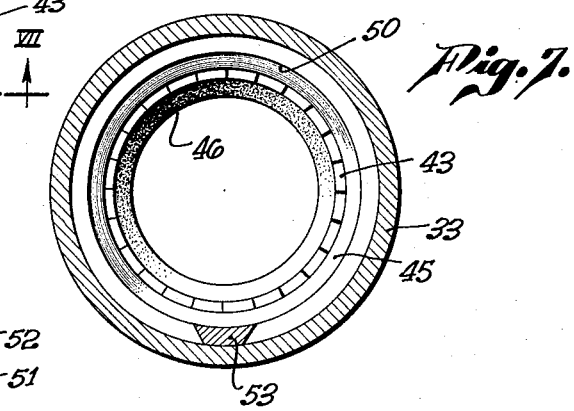
Fig. 7.
INVENTOR
DANTE A. SIRACUSA,
BY
ATTORNEY Patented May 22, 1951

2,553,985

UNITED STATES PATENT OFFICE 2,553,985

FISHING TOOL

Dante A. Siracusa, Huntington Beach, Calif.

Application October 2, 1945, Serial No. 619,776

7 Claims. (Cl. 294—102)

This invention relates to fishing tools and is particularly directed to a fishing tool of the overshot type adapted to be lowered into a well for the purpose of retrieving tubular or cylindrical objects such as drill pipe, drill stem, sucker rods, tools, etc., which may be lodged in the well. In all well drilling operations the possibility exists that a piece of drill pipe, drill stem, well string, macaroni, tubing or other tool or portion of the drilling string may either be dropped into the well or become loose, broken off, or otherwise left in the hole. It is necessary to remove such objects (generally called "fish") in order to continue drilling operations or permit the well to be placed on production. The cost of drilling a well precludes the possibility of abandoning the hole and starting a new one. It is important, therefore, that suitable fishing tools be provided capable of being used at great depths below the surface for the purpose of positively and tenaciously grasping the fish.

A string of drilling tools may include drill pipe, upsets, drill stems, tool joints, drill collars, etc. The component parts of a single string may vary in diameter very appreciably. For example, a 4½" drill pipe may carry an external upset section of 5⅛", tool joints of 6⅛" and a 7" drill collar (all outside diameters). Very often the diameter of the fish which is to be grasped is not known. A break may have occurred just above an upset or in close proximity to a tool joint. For this reason the fishing tool should be able to accommodate a variety of sizes of objects to be grasped in order to expedite the fishing operation.

Moreover, the fishing tool should be simple and positive in its operation and of short length. It should be capable of grasping a fish easily and holding it firmly so that tools buried or pinched by a cave-in can be pulled out of the hole. It should also be arranged to release or disengage a fish when conditions make this necessary, and such release should be accomplished without the danger of parting the drill pipe at a point above the tool.

These requirements have not been met by fishing tools devised heretofore but are believed to be completely fulfilled by the device of the present invention.

Generally stated, this invention relates to a fishing tool of relatively short length and of simple construction so that it is positive and substantially foolproof in its operation. The tool described hereinafter consists of a tubular body portion provided with tapered inner sections, each of such sections including a tubular gripping sleeve of C form, at least one edge of such sleeve cooperating with a key or anchor within the body portion. When this tool is lowered into a well over a fish, the sleeve expands radially, one of the longitudinal edges of the sleeve being prevented from maintaining a uniform spacing with the other edge of the sleeve by reason of the anchor. In this manner the sleeve encircles the fish and when an upward pull is exerted through the tubular body portion, the tapered inner surfaces of the body portion effect contraction of the sleeve about the fish.

It is an object of the present invention, therefore, to disclose and provide a simple and efficient fishing tool of the overshot type.

Another object of the invention is to disclose and provide a fishing tool which is of short length and which is capable of firmly grasping objects of different diameters, so that a single tool may accommodate a variety of objects.

A further object of the invention it to provide a fishing tool of novel and simple construction in which all of the component parts are firmly retained within the tool and are caused to operate automatically.

A still further object of the invention is to provide a fishing tool which does not employ slips but instead exerts a contractil grasping action around virtually the entire circumference of the fish being grasped.

These and other objects of the invention will become apparent to those skilled in the art from the following description of exemplary forms of devices embodying the invention. In order to facilitate understanding, reference will be had to the appended drawings, in which:

Fig. 4 is a transverse section taken along the plane IV—IV in Fig. 2.

Fig. 5 is a transverse section taken along the plane V—V in Fig. 2.

Fig. 6 is a longitudinal section of a modified form of device.

Fig. 7 is a transverse section taken along the plane VII—VII in Fig. 6.

Figure 1:
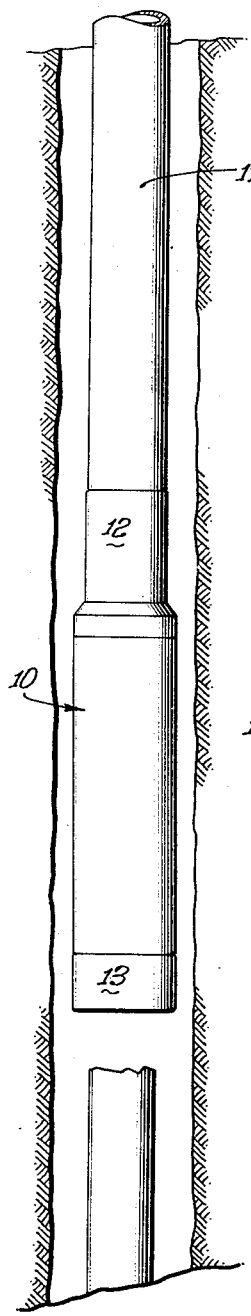
Fig. 1 is a longitudinal elevational view of the device being lowered into a well hole over a fish.

Fig. 1 shows a simplified form of fishing tool embodying this invention, indicated at 10, being lowered into a well hole by the drill pipe 11. The body of the tool is connected to the drill pipe by means of a top sub 12. The lower end of the tubular body portion of the tool is provided with a nose piece or shoe 13. A piece of parted pipe which constitutes the fish is shown in the bottom of the view.

Figure 2:
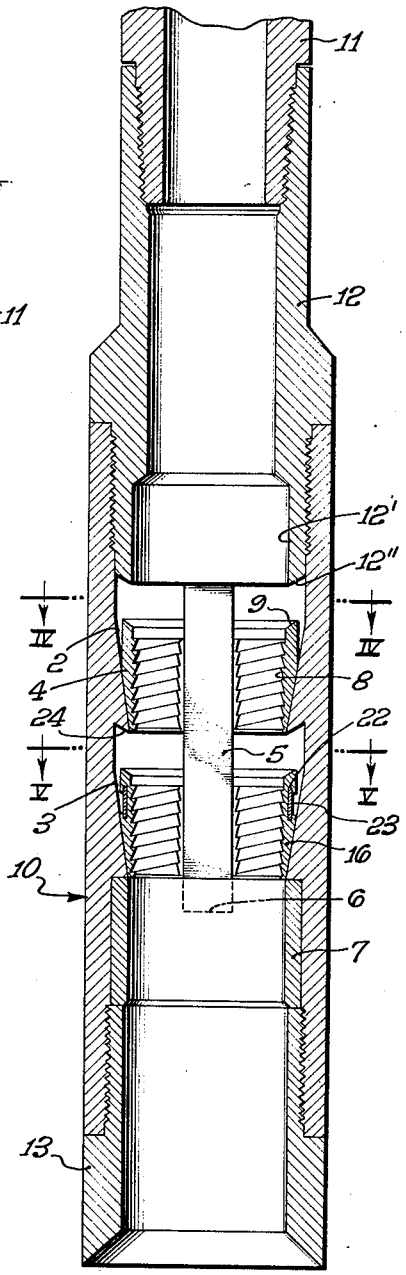
Fig. 2 is a longitudinal section of a simplified form of device, said section corresponding to a plane along II—II in Fig. 4.
Figure 3:
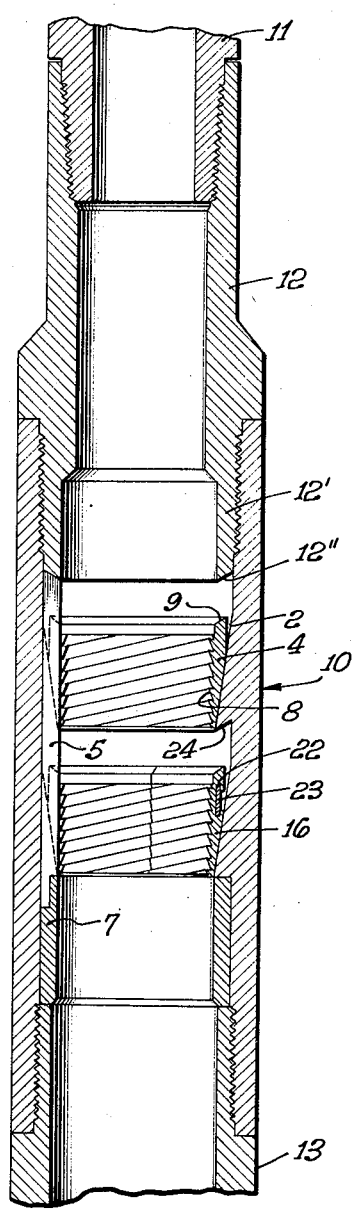
Fig. 3 is a longitudinal section taken along the plane III—III in Fig. 4.

Figs. 2, 3 and 4 are enlarged views showing the construction of this simple form of fishing tool. As there indicated, the tubular body portion 10 is provided with two upwardly and outwardly tapered, conical, separate, inner surface sections indicated at 2 and 3. A radially expandable gripping sleeve is positioned within each of these tapered sections. Gripping sleeve 4 is provided with a longitudinal slot adapted to receive an anchor or key 5 carried within the body and cooperating with the longitudinal edges of the sleeve 4 so as to prevent free, unrestricted rotation of the sleeve within the body. The lower end of the anchor or key 5 may be provided with a tongue which is received within a socket 6 formed in a collar 7 which is held in place below the lowermost taper 3 by the nose piece 13. Additional holding means, such as a set screw, pin or the like, may also be used to hold the key in place.

The upper end of the anchor 5 is provided with a tapered face and abuts the outwardly and upwardly inclined face 12'' of lip 12' of sub 12, the lip 12' also acting as a removable means for limiting the longitudinal movement of the gripping sleeve 4 within the upper tapered section of the tubular body portion of the tool.

The sleeve 4 has a virtually cylindrical interior or inner surface which is normally smaller than the internal diameter of the body portion or the internal diameter of the retaining collar 7. This internal face of the gripping sleeve 4 is preferably provided with helically arranged gripping teeth 8; said teeth presenting substantially flat upper surfaces by means of which a fish may be grasped and pulled upwardly. The exterior surface of the sleeve 4, or at least a portion of such exterior surface, is tapered so as to correspond to the tapered surface 2 whereby the sleeve 4 may move longitudinally within the tapered section of the body portion, upward movement being restricted by the stop element or lip 12'. The upper edge of the sleeve may be provided with a dished end face 9 adapted to engage the tapered end face 12'' of the lip.

The key 5 is shown dovetailed (Fig. 4) and preferably, when the gripping sleeve 4 is at the bottom of its limited travel (as shown in Fig. 2), the edges 14 and 15 of the gripping sleeve protrude inwardly slightly beyond or above the surface or centrally directed, longitudinally extending inner face of the anchor or key 5.

It will be evident that the sleeve 4 may be readily inserted from the upper end of the tubular body of the tool around the anchor 5. Some difficulty, however, would be experienced in inserting the lower, radially expandable sleeve 16 and for this reason the sleeve 16 is composed of a plurality of sections arranged to provide a virtually cylindrical inner surface normally smaller than the interior diameter of the body portion or the external diameter of the fish to be grasped.

As best shown in Fig. 5, the gripping sleeve 16 may be composed of three or four sections 17, 18, 19, and 20, two longitudinal edges of such assembled sleeve cooperating with the anchor 5. A portion of the outer surface of such sleeve is tapered to correspond to the taper 3 formed on the internal surface of the body portion and in order to maintain these sections 17—20 in substantially cylindrical form and cause them to operate as a unit, the outer surface of such sections may be provided with a dovetailed groove, indicated at 22, such groove being adapted to slidably receive a length of flexible, resilient metal band 23 which thereby joins the various sections together.

From the description given, it will be evident that the device may be lowered into the well so as to straddle the fish. The device may, of course, employ various types of nose pieces 13. A shoe provided with a cutting edge or teeth cut on the lower end, may also be employed for the purpose of removing burrs or splinters, which may extend from the fish. At all events, the fishing tool is lowered over the fish and rotated. Contact of the gripping sleeves 4 and 16 with the fish, coupled with the rotation of the tool, will cause the sleeves to expand radially, one edge, such as the edge 14, being restrained from rotation with respect to the body by the anchor 5 while the other edge 15 may move away from the anchor 5. As previously pointed out, the edges 14 and 15 of each gripping sleeve extend inwardly above the surface of anchor 5 and therefore an edge such as 14 is free to engage the fish so that rotation of the tool will cause the resilient sleeve to radially expand. Such radial expansion of the gripping sleeves is accompanied by an upward movement of the sleeves within the tapered sections of the body portion, such upward movement being limited by the stop means such as the shoulder 12'' and the shoulder 24 (which separates the two tapered sections 2 and 3). When the tool straddles a fish, which contacts gripping sleeve 4, such sleeve will move upwardly until end 9 contacts taper 12''. Downward pressure of the tool against the fish and sleeve 4 is thus caused to expand sleeve 4 by cooperative action of taper 12'' against end 9. Prior to contact of end 9 with taper 12'' the expansion of the C-shaped, resilient sleeve 4 was due to the rotation of the tool with respect to the fish.

After the fish has been caused to extend into the tool a desired distance, rotation is discontinued and the drill pipe 11 is raised. The gripping sleeves 4 and 16 thereupon are effectively contracted about the fish by reason of the tapers on the internal surface of the body and the external surface of the gripping sleeves. The fish may thereupon be pulled out of the hole. If for some reason it is necessary to release the fish, the drill stem 11 and the tool may be bumped down (as by lowering the weight of the stem upon the fish) and then rotated in the same or normal direction and simultaneously lifted, thereby causing the teeth 8 to release their grip from the fish, such releasing action being facilitated by the left hand helix of the teeth on the gripping sleeves. Although normal rotation of the stem is usually employed in releasing the fish (this preventing accidental unscrewing of joints in the stem 11), under some circumstances a reverse rotation may be desirable, and the tool will release the fish when such reverse rotation is employed, thereby exhibiting a facility not possessed by other tools.

The device illustrated in Figs. 1 to 5 shows gripping sleeves which are smaller than the external diameter of the object to be grasped but of substantially identical diameter to each other. Since in many instances the precise diameter of the fish is not known, a compound fishing tool is preferably employed, such tool being provided with a plurality of gripping sleeves of different diameters, such compound tool being capable of grasping objects which may be of any diameter within the limits of the tool.

Figs. 6 and 7 refer to a multiple type of tool and as there shown the drill pipe 11 is attached by means of the collar 12 to a fishing tool which may be made of tubular, interlocking, body portions 31, 32, and 33, the lowermost body portion being provided with a nose piece 34. Each of these tubular body portions is provided with one or more upwardly and outwardly tapered inner surface sections as previously described in connection with Figs. 2 to 4.

The radially expandable gripping sleeve 35 may be similar in construction to the gripping sleeve 4, whereas the gripping sleeve 36 may be similar to the gripping sleeve 16. The anchor or key 37 may be similar to the key 5 but the lower end of such key 37 may now be retained or held within a cavity or recess formed in a milling ring 38 held between opposing shoulders of the adjacent tubular sections 31 and 32. The lower edge of the milling ring 38 is provided with suitable teeth 39 adapted to remove burrs from outer edges of fish.

It will be noted that very often, when a string breaks during drilling, the break is not immediately apprehended by the operator and drilling or rotation continues for some minutes so that the upper end of the fish is mushroomed, distorted, and expanded. Milling teeth, such as carried by the ring 38, effectively remove the outwardly extending burrs from the upper end of the fish and facilitate the penetration of the fishing tool by the fish.

The tubular section 32 is also provided with a tapered inner surface 40 and a radially extendable gripping sleeve 41. The key 37 may extend through the slot in the gripping sleeve 41 and through a slot formed in the outer wall of the milling sleeve 38. Inasmuch as the tubular sections 31 and 32 are fastened together as at 42, the gripping sleeve 41 may be of one piece and similar to sleeve 4. The inner diameter of the gripping sleeve 41 is somewhat larger, however, than the diameter of the sleeves 35 and 36.

Between the body portion 33 and the tubular body portion 32 there may be positioned a milling sleeve or ring 43, such ring being recessed as at 44 to receive the lower end of the key or anchor 37. The milling sleeve 43 may be retained between a shoulder formed in the tubular portion 32 and a hardened retaining ring 45 carried by the tubular portion 33. Ring 45 and the milling ring assist in centering and guiding a fish from the lower portion 33 into the upper portions 32 and 31 of the tool. As clearly shown in the drawings, a ring 46 carried by the milling ring 43 has a flexible, inwardly and upwardly extending portion which acts as a packing against a fish and permits circulation to be established from drill pipe 11 directly into and through the fish. The lower edge of the milling ring 43 is provided with suitable milling teeth for the purpose of removing burrs in the same manner as the upper ring 38.

The lower section 33 of the tool carries radially extendable rings 48 and 49 and since the upper portion of the tubular body 33 is provided with an inwardly extending shoulder 50 which acts as a stop means for limiting the upward travel of gripping sleeve 48, both of the gripping sleeves 48 and 49 are of the segmental construction referred to in connection with gripping sleeve 16.

Below these two gripping sleeves the tubular section 33 may carry a milling ring 51 also provided with a flexible packing device 52. Such milling ring 51 may carry means cooperating with the key 53 for holding such key in position. If desired, the inwardly extending flange 50 may also be provided with a recess adapted to receive the end of key 53.

It is to be understood that suitable pins, locking screws or splines may be used in holding the various body sections together after they are assembled, and similar locking means may be used in preventing rotation of the milling rings 38, 43, and 51 within the tubular body sections.

It will be evident to those skilled in the art that the device illustrated in Fig. 6 may be lowered into a well over a fish and such fish may be of an unknown diameter but the tool will receive and tenaciously grasp and hold the fish. The internal diameter of the lowermost rings 48 and 49 is larger than the grasping ring 41 which, in turn, is of larger internal diameter than the sleeves 35 and 36. The tool, therefore, is capable of grasping objects within the extensive range of all of the rings. If a relatively small diameter fish is encountered, such fish will be grasped by the upper gripping sleeves 35 and 36. In the event the fish is of large diameter, it will be grasped by the larger gripping sleeves 48 and 49.

It is to be noted that the various sleeves are closely adjacent so that the total length of this multiple tool is relatively short. In some instances, the fish carries a split collar or a broken external upset at its upper end, the length of this enlarged end portion of the fish being smaller than the distance separating gripping rings 4 and 16, for example. Means have been provided, between gripping sleeves of different diameters, for removing burrs and smoothing the upper edges of the fish for positive engagement with the gripping sleeves and for guiding the fish. In actual practice it has been found that the tool herein described is readily manufactured and positive and foolproof in its operation.

The invention is not to be limited to the use of any particular type of anchor, to the use of milling rings in the specific manner illustrated, nor to the use of the packing means. One or more gripping sleeves may be embodied in a tool and the exemplary forms described are merely illustrative and not limiting. The keys or anchors 5, 37, 53, etc., may be integral with the tubular body, or may be welded to or be integral with one edge of the gripping sleeve. Instead of helical teeth, the resilient sleeves may be provided with a knurled gripping surface. All changes coming within the scope of the appended claims are embraced thereby.

I claim:

1. A tool for grasping an object in a deep well comprising: a rigid tubular body portion provided with an upwardly and outwardly tapered, conical inner surface section; a radially expandable, resilient, C-shaped gripping sleeve within the tapered section of the body portion, said sleeve having upper and lower edges in substantially parallel planes perpendicular to the axis of the body and a pair of longitudinally spaced edges, said sleeve having a virtually cylindrical interior normally smaller than the internal diameter of the body portion and an exterior tapered surface corresponding to the tapered section of the body portion; means for limiting longitudinal movement of the sleeve within the body portion; and a stationary anchor positioned within the body portion cooperating with one longitudinal edge of the sleeve to restrain such edge from rotation within the body, the other longitudinal edge of the sleeve extending inwardly to beyond the centrally facing, longitudinally extending face of the anchor to engage an object to be grasped, and arranged to be moved in a tangential, outward direction when the tool is rotated in either direction and lowered over the object to be grasped, said tapers effecting contraction of the sleeve about an engaged object when rotation is discontinued and the body section is moved upwardly.

2. In a fishing tool; a rigid tubular body portion provided with an upwardly and outwardly tapered, inner, circumferential surface section extending between spaced planes perpendicular to the axis of such body; a radially expandable, resilient, C-shaped, gripping sleeve within the tapered section of the body portion, said sleeve having upper and lower edges in substantially parallel planes perpendicular to the axis of the body, and a pair of spaced longitudinal edges; said sleeve being arranged to provide a virtually circular inner surface normally smaller in diameter than the internal diameter of the body portion and an exterior surface corresponding to the tapered section of the body portion; a stationary anchor positioned within the body and immovable with respect thereto, said anchor cooperating alternatively with one of the longitudinal edges of the sleeve to restrain such edge from rotation within the body, the spaced longitudinal edges of the sleeve extending inwardly above the centrally directed, longitudinally extending face of the anchor to permit one edge to be restrained from rotation by cooperation with the anchor, while the other edge engages an object being grasped and to cause said sleeve to expand radially when the body is rotated with respect to the object in either direction; said tapers effecting contraction of the sleeve about an engaged object when the body section is moved upwardly with respect to the sleeve.

3. In a fishing tool: a rigid tubular body portion provided with an upwardly and outwardly tapered, inner, circumferential surface section extending between spaced planes perpendicular to the axis of such body; a radially expandable, resilient, C-shaped, gripping sleeve within the tapered section of the body portion, said sleeve having upper and lower edges in substantially parallel planes perpendicular to the axis of the body, and a pair of spaced longitudinal edges; said sleeve being composed of a plurality of adjacent sections and arranged to provide a virtually circular inner surface normally smaller in diameter than the internal diameter of the body portion and an exterior surface corresponding to the tapered section of the body portion; a stationary anchor positioned within the body and immovable with respect thereto, said anchor cooperating alternatively with one of the longitudinal edges of the sleeve to restrain such edge from rotation within the body, the spaced longitudinal edges of the sleeve extending inwardly above the centrally directed, longitudinally extending face of the anchor to permit one edge to be restrained from rotation by cooperation with the anchor, while the other edge engages an object being grasped and to cause said sleeve to expand radially when the body is rotated with respect to the object in either direction; said tapers effecting contraction of the sleeve about an engaged object when the body section is moved upwardly with respect to the sleeve.

4. A fishing tool of the character stated in claim 3, wherein the sections of the sleeve are removably connected together to act as a unit within the body portion.

5. A fishing tool of the character stated in claim 3, wherein the exterior tapered surface of the sleeve sections is provided with an undercut groove, and a resilient metal band extends through said groove and connects the sections together.

6. In a fishing tool: a rigid, tubular body portion including a gripping means movably carried by the inner surface of the body portion; a collar positioned within the body portion below said gripping means, a recess formed in the edge of the collar and a key having its lower portion in the recess, said key extending upwardly into operative contact with the gripping means.

7. In a fishing tool: a rigid, tubular body portion including a gripping means movably carried by the inner surface of the body portion; a collar positioned within the body portion below said gripping means, a recess formed in the edge of the collar, a key having its lower portion in the recess, said key extending upwardly into operative contact with the gripping means, and a flexible inwardly extending packing member carried by said collar.

DANTE A. SIRACUSA.

REFERENCES CITED

The following references are of record in the file of this patent:

UNITED STATES PATENTS

| Number | Name | Date |
| --- | --- | --- |
| 1,493,234 | Benson | May 6, 1924 |
| 1,526,741 | Cailloux et al. | Feb. 17, 1925 |
| 1,529,734 | Barbour et al. | Mar. 17, 1925 |
| 1,660,449 | Kinney | Feb. 28, 1928 |
| 1,678,829 | Scott et al. | July 31, 1928 |
| 1,710,294 | Cailloux | Apr. 23, 1929 |
| 1,780,134 | Le Bus | Oct. 28, 1930 |
| 2,174,077 | Bowen | Sept. 26, 1939 |
| 2,285,838 | Rea | June 9, 1942 |
| 2,295,630 | Bowen | Sept. 15, 1942 |